United States Patent [19]

Moore

[11] Patent Number: 4,539,570

[45] Date of Patent: Sep. 3, 1985

[54] STACKABLE FLUID DISPENSING APPARATUS

[75] Inventor: Eugene W. Moore, Hurst, Tex.

[73] Assignee: Willett International Limited, Slough, England

[21] Appl. No.: 559,752

[22] Filed: Dec. 9, 1983

[51] Int. Cl.³ .......... G01D 15/18

[52] U.S. Cl. .......... 346/75; 346/1.1; 346/140 R; 400/126

[58] Field of Search .......... 346/75, 140 R, 1.1; 400/126

[56] References Cited

U.S. PATENT DOCUMENTS

| | | | |
|---|---|---|---|
| 3,747,120 | 7/1973 | Stemme | 346/75 |
| 3,946,398 | 3/1976 | Kyser | 346/75 X |
| 4,002,230 | 1/1977 | Schweppe | 346/75 X |
| 4,215,350 | 7/1980 | Mielke | 346/75 |
| 4,378,564 | 3/1983 | Cross | 346/75 |

*Primary Examiner*—Joseph W. Hartary
*Attorney, Agent, or Firm*—Charles D. Gunter, Jr.

[57] ABSTRACT

A stackable fluid dispensing apparatus has a case and a fluid manifold located within the case which is adapted to be connected to a source of pressurized fluid. A plurality of valves located within the case are connected to the fluid manifold by a plurality of fluid lines. A nozzle block on the case has a plurality of fluid dispensing openings positioned within an exterior face of the nozzle block in at least one line. Fluid tubes communicate each of the valves with a selected one of the nozzle block openings whereby actuation of the valves controls the flow of the fluid through the nozzle block openings. The dispensing openings at the outermost extents of the line in the nozzle block are located adjacent opposite edges of the exterior face. The distance from the center of each of the opposite outermost dispensing openings to the respective adjacent edge of the exterior face is one half the center to center distance of any two remaining dispensing openings in the line. The precise nozzle spacing on the nozzle block allows two or more of the devices to be stacked one upon the other without affecting overall print quality the nozzle block is removably mounted on the case to allow alternate nozzle blocks to be mounted on the case, the alternate nozzle blocks having different dispensing opening spacing.

10 Claims, 7 Drawing Figures

STACKABLE FLUID DISPENSING APPARATUS

BACKGROUND OF THE INVENTION

This invention relates generally to a high speed, multi purpose, fluid dispensing apparatus and, specifically, to a printing apparatus of the type used to dispense ink for printing graphics images onto a target substraight.

This application is related to the copending application of Henry P. Taylor, et al., Ser. No. 441,285, filed Nov. 12, 1982, entitled MULTIPURPOSE FLUID DISPENSING APPARATUS. In that application, a multipurpose fluid dispensing apparatus, specially adapted for ink jet printing is shown which utilizes a technique in which ink drops are issued only on demand rather than in a continuous stream. A plurality of nozzels are provided through which ink can be intermittently, selectively ejected. Solenoid valves located between a source of pressurized ink and the ink nozzels are electrically opened and closed to dispense ink toward the target substraight. The ink nozzels are mounted in an orifice block which is integrally mounted on the case containing the valves, fluid tubing and electrical circuitry.

Although the orifice block could be removed to replace or repair damage to the nozzel openings, the design did not readily allow the substitution of nozzle blocks with different nozzle spacings. The height of the orifice block was limited based upon the associated height of the intergral print head case. Although two or more print heads could be stacked one upon the other with the nozzle orifices aligned, a space or gap existed between the top outermost nozzle orifice of the bottom print head and the bottom outermost nozzle orifice of the top print head. The design thus did not completely solve the problem posed by the need to increase character height and was not easily adapted to allow graphic printing which requires more nozzle orifice openings.

In U.S. Pat. No. 4,215,350, issued July 29, 1980, entitled INK JET PRINTING APPARATUS WITH TWO DIFFERENT JET SPACING, an apparatus is shown for printing characters which allows the height of the characters to be varied by means of a switch between two different groups of solenoid valves which control two groups of nozzels. The device depended upon electrical control for obtaining an increase in character height and was therefore complicated in design and expensive to manufacture.

SUMMARY OF THE INVENTION

The stackable fluid dispensing apparatus of the invention has a case with a fluid manifold located within the case which is adapted to be connected to a source of pressurized fluid. A plurality of valves are located within the case with each valve being connected to the fluid manifold by a fluid line. A nozzle block is mounted on the case which has a plurality of fluid dispensing openings positioned within an exterior face of the nozzle block in at least one line. Fluid passage means communicate each of the valves with a selected one of the nozzle block openings whereby actuation of the valves controls the flow of the fluid through the nozzle openings. Electrical control means are provided for controlling the actuation of the valves. The dispensing openings at the outermost extents of the line in the nozzle block are located adjacent opposite edges of the exterior face. The distance from the center of each of the opposite outermost dispensing openings to the respective adjacent edge of the exterior face is one half the center to center distance of any two remaining dispensing openings in the line. The nozzle block is removably mounted on the case to allow alternate nozzle blocks to be mounted on the case, the alternate nozzle blocks having different dispensing opening spacing.

Additional objects, features and advantages will be apparent in the written description which follows.

DETAILED DESCRIPTION OF THE INVENTION

Figure 1:
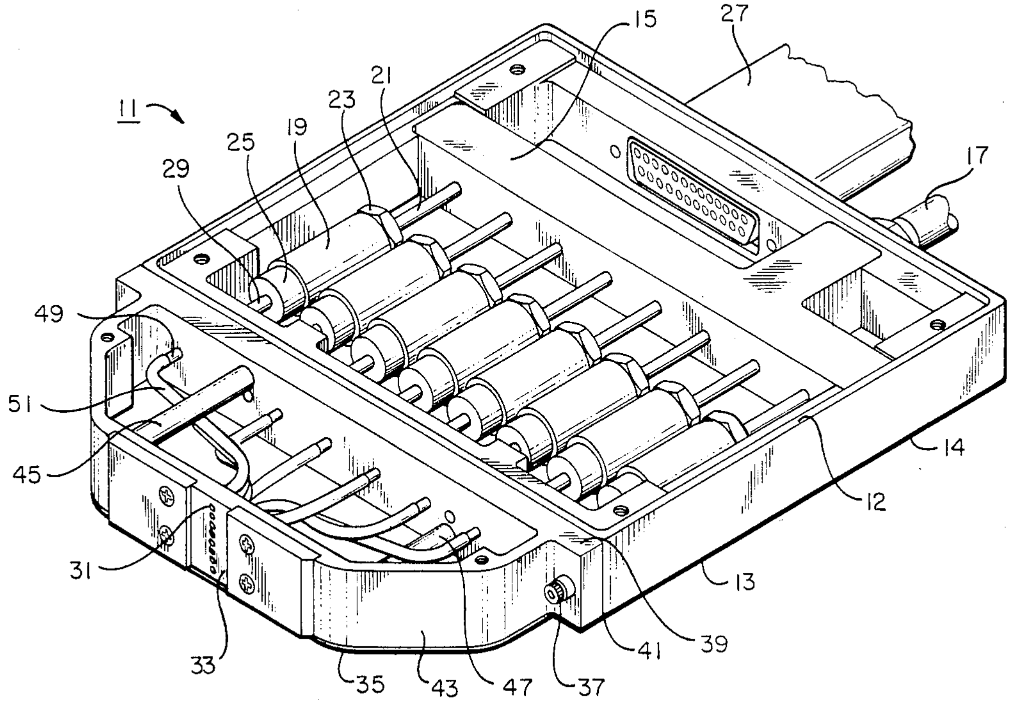
FIG. 1 is perspective view of the apparatus of the invention with portions broken away for ease of illustration.

FIG. 1 shows a stackable fluid dispensing apparatus of the invention designated generally as 11. The fluid dispensing apparatus includes a generally rectangular case 13, preferably molded from impact resistant plastic. The case 13 includes a fluid manifold 15 which is connected by means of a hose 17 to any suitable source of pressurized fluid to be dispensed. The preferred fluid to be dispensed is ink although it should be understood that other fluids could be dispensed as well such as adhesives or glues and the like.

A plurality of valves, such as solenoid valves 19 are located within the case 13 with each of the valves 19 being connected to the fluid manifold 15 by a separate fluid line 21. Each of the valves 19 has an inlet end 23 for receiving ink to be dispensed from the fluid manifold and an outlet end 25 for dispensing ink upon electrical actuation of the solenoid valve element.

An electrical cable 27 connects an electrical control means, such as a microcomputer (not shown), to the valves 19 for controlling the actuation of the valves. The electrical cable 27 is typically connected to a printed circuit board which has leads passing to the valves 19. The valves 19 can then be selectively and intermittently actuated by the electrical control means to allow ink to flow from the manifold 15 through the valve outlet ends 25 and through suitable fluid passage means 29 to selected fluid dispensing openings 31.

As shown in FIG. 1, the fluid dispensing apparatus 11 has a nozzle block 33 which is carried in a removable front end 35 which is mounted by means of screws 37 onto the case 13. The removable front end 35 is preferably machined from metal and includes a rear wall 39 which is mounted flush with the front side wall 41 of the case 13. The removable front end 35 includes a curving outer wall portion 43 which is spaced apart from the rear wall 39 and front side wall 41 of the case 13. A pair of support rods 45, 47 provide added stability for the front end 35.

As shown in FIG. 1, the fluid passage means 29 leading from the outlet ends 25 of the valves 19 are connected by means of connecting tubes 49 passing through walls 39, 41 to flexible tubes 51 which are connected to selected ones of the fluid dispensing openings 31. In this way, actuation of the valves 19 by the electrical control means controls the flow of fluid through the fluid dispensing openings 31.

Figure 3:
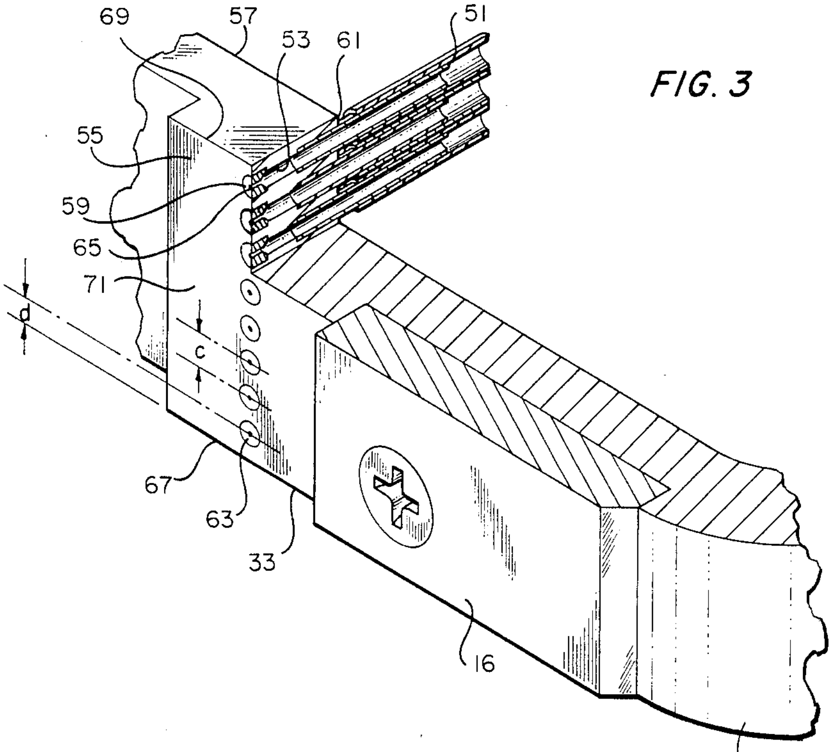
FIG. 3 is a partial perspective view of the removable nozzle block of the invention.

FIG. 3 shows one embodiment of the removable front end 35 of the invention with portions of the front end broken away for ease of illustration. The nozzle block 33 includes a plurality of transverse holes 53 which communicate the front and rear walls 55, 57 thereof. A bumper or guard block 16 is attached to the front end 35 to aid in aligning a package moving past the unit 11 with the fluid dispensing openings. Each of the holes 53 is adapted to receive a jeweled orifice 59 such as the jewels used in acetylene torches and the like. The jeweled orifice 59 is received adjacent the front wall 55 and a connecting tube 61 is provided within the hole 53 adjacent the rear wall 57 thereof for communicating with the flexible tubes 51 and, in turn, with the valves 19.

As shown in FIG. 3, the fluid dispensing opening 63, 65 at the outermost extents of the nozzle block 33 are located adjacent opposite edges 67, 69 of the exterior face 71 of the nozzle block 33. The distance "d" from the center of the outermost dispensing openings 63 to the respective adjacent edge 67 of the exterior face 71 is one half the center to center distance "c" of any two remaining dispensing openings in the exterior face 71. Opening 65 is similarly located with respect to adjacent edge 69.

Figure 2:
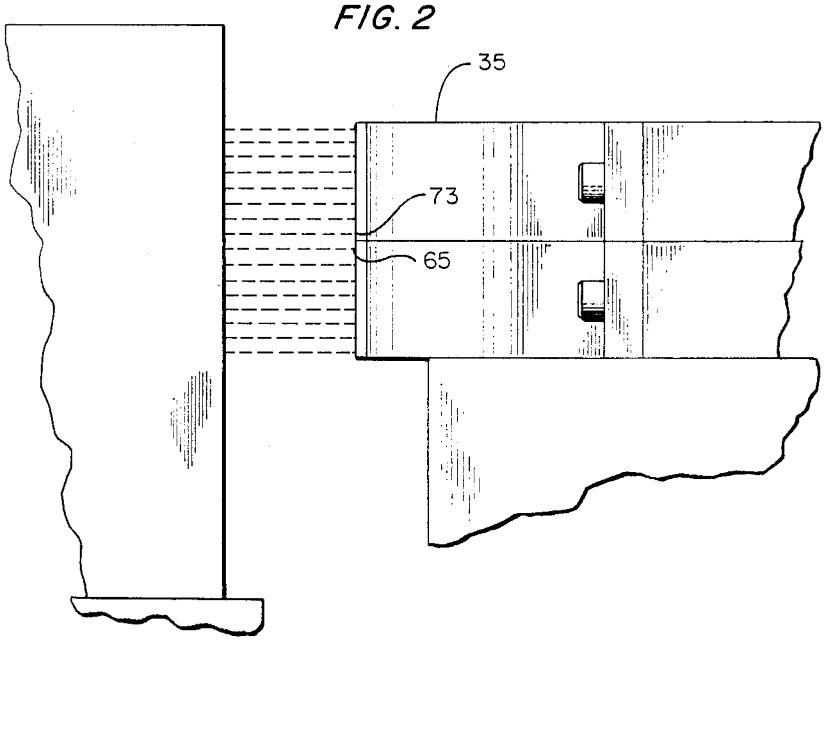
FIG. 2 is a side schematic view of the operation of two of the devices of the invention stacked one upon the other.

The spacing of the openings 63, 65 on the exterior face 71 allow two or more fluid dispensing devices of the invention to be stacked one upon the other as shown schematically in FIG. 2. Because the removable front end 35 is machined from metal to a cloe tolerance and because of the precise spacing of the dispensing openings (65, 73 in FIG. 2) at the top and bottom outermost extents, respectfully, of the exterior faces, the character height being printed can be increased while maintaining uniform print quality upon the target substraight.

The character height printed by a single apparatus such as that designated as 11 in FIG. 1, can also be varied by interchanging the removable front end 35 and installing an alternate front end having a nozzle block with a different spacing for the openings 31. The height of the character printed is variable over a wide range since the spacing of the openings (63, 65 in FIG. 2) is not limited by the dimensions of the case 13. In fact, the distance between edges 65, 67 of the removable front end 35 can be several times the distance between the top and bottom surfaces 12, 14 of the associated case 13 without interfering with the operation of the device.

Figure 4:
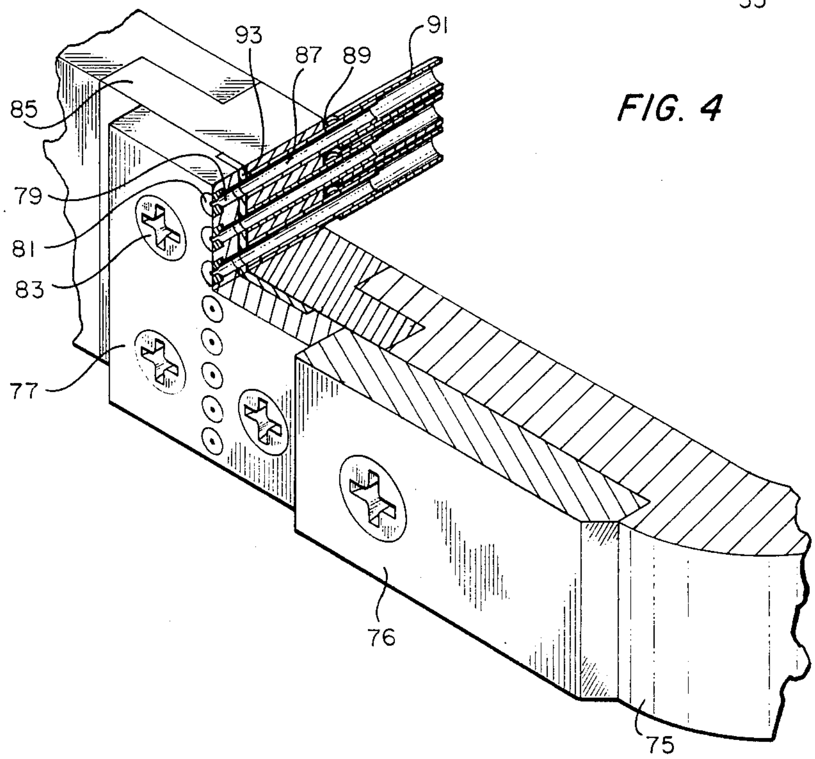
FIG. 4 is a partial perspective view of the nozzle block of the invention similar to FIG. 3.

FIG. 4 shows another embodiment of the removable front end 75 of the invention. The removable front end 75 carries a nozzle block 77, adjacent a bumper or guard 76. The nozzle block 77 has a plurality of holes 79 in which are received jeweled orifices 81. The nozzle block 77 is connected by screws 83 to a removable portion 85 of the front end 75 which is provided with transverse openings 87. Each of the openings 87 is adapted to receive a connecting tube 89 which is, in turn, received within a selected one of the flexible tubes 91 leading to the valve elements 19. The interface between the nozzle block 77 and removable front end portion 85 can include an elastomeric material 93 to insure a tight fluid seal. This embodiment of the nozzle block 77 facilitates replacement of the jeweled orifices 81.

Figure 5:
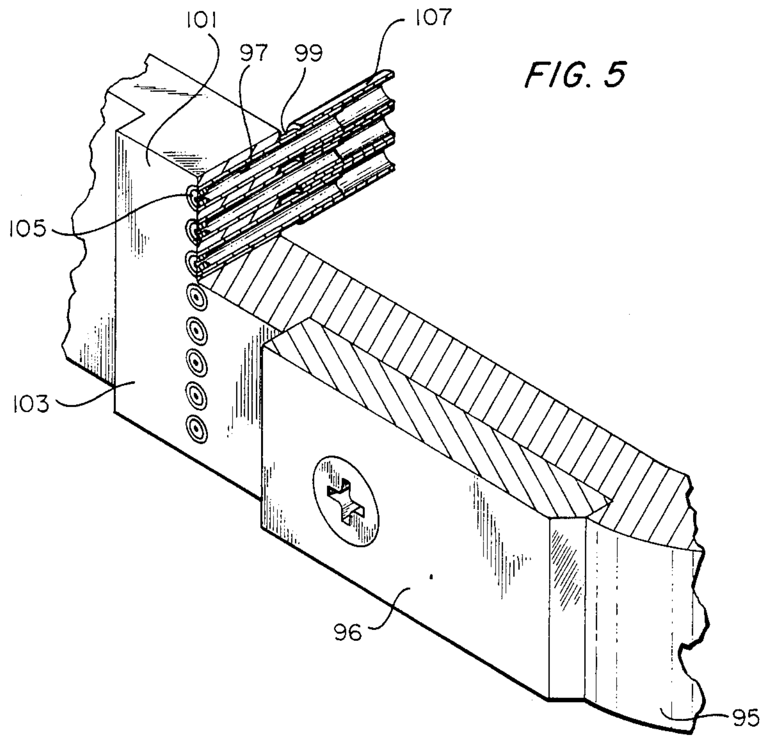
FIG. 5 is a partial perspective view of the nozzle block of the invention similar to FIG. 4.

FIG. 5 shows another embodiment of the removable front end 95 of the invention. The removable front end 95 contains a plurality of transverse holes 97 into which is received a plurality of connecting tubes 99. The connecting tubes fit flush with the exterior face 101 of the nozzle block 103 and are adapted to receive a jewel orifice 105. The connecting tubes 99 are, in turn, received within flexible tubes 107 leading to the valve elements 19. The front end 95 also is provided with a guard block 96.

Figure 6:
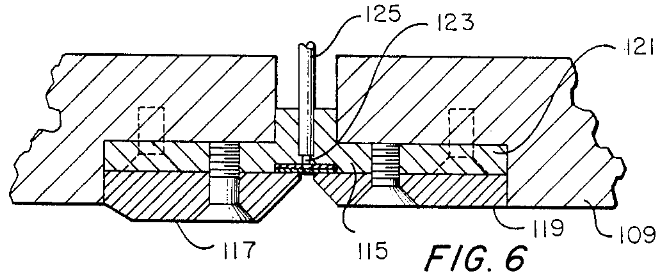
FIG. 6 is a top cross sectional view, partially broken away, of the nozzle block of the invention.
Figure 7:
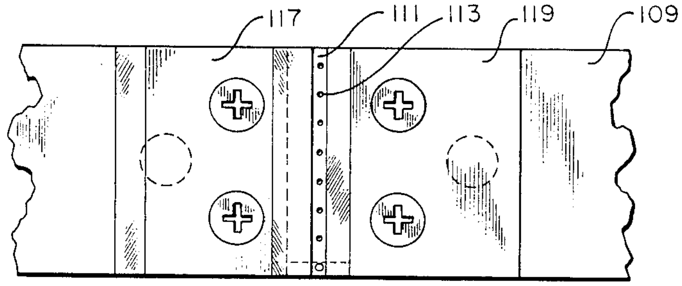
FIG. 7 is a front perspective view, partially broken away, of the nozzle block of FIG. 6.

FIGS. 6 & 7 shows another embodiment of the removable front end 109. The nozzle block 109 has an exterior face 111 comprising of a metal plate having a series of machined openings 113 therein, arranged in a single vertical line. The plate 111 is received upon a central portion 115 (FIG. 6) of the nozzle block 121 and retained in position by mounting flanges 117, 119. The central portion 115 of the nozzle block 121 is provided with a plurality of transverse holes 123 which are alignable with the plate holes 113 (FIG. 7) each of the nozzle block holes 123 being fitted with a connecting tube 125 for communicating with the valve elements 19.

In operation, a removable front end 43 (FIG. 1) would be selected for the case 13 having fluid dispensing openings 31 spaced on the nozzle block 33 in a predetermined manner to print characters of the size generally required for the application at hand. The size of the character could be doubled by stacking two of the devices one upon the other, as shown in FIG. 2. The additional number of openings 31 would also provide a larger dot matrix for printing graphic images such as logos and the like. Since the front end 43 is removable, the identical case 13 and components contained therein can be used to operate a nozzle block 43 having variable character spacing. This result reduces the manufacturing cost of the apparatus since the case components are identical in each case. Characters are printed by the electrical actuation of the solenoid valves 19 which selectively and intermittently allow ink to pass from the fluid manifold 15 through the fluid line 21 and, in turn, through the flexible tubes 51 and openings 31 to the target substraight.

An invention has been provided with significant advantages. The fluid dispensing apparatus of the invention is a low profile, stackable unit which allows increased character height by stacking two or more units, one upon the other. The precise spacing of the fluid dispensing openings in the nozzle block allows stacked units to print larger characters without disturbing the overall print quality. The result is achieved without complicated electrical circuitry or mechanical moving parts such as mechanisms to vary the orientation of the nozzle block and dispensing openings. The removable front end allows the same case and component parts to be used with nozzle blocks having different character heights.

While the invention has been shown in only four of its forms, it is not thus limited but is susceptible to various changes and modifications without departing from the spirit thereof. Thus, although only one line of fluid dispensing openings is shown on the nozzle blocks illustrate, it should be understood that additional lines or patterns of dispensing openings could be present as well including lines of dispensing openings which diagonally span the exterior face of the nozzle block.

I claim:

1. A stackable fluid dispensing apparatus, comprising:

a case;

a fluid manifold located within said case and adapted to be connected to a source of pressurized fluid;

a plurality of valves located within said case, each of said valves connected to said fluid manifold by a fluid line;

a nozzle block on said case, said nozzle block having a plurality of fluid dispensing openings positioned within an exterior face of said nozzle block in at least one line;

fluid passage means communicating each of said valves with a selected one of said nozzle block openings whereby actuation of said valves controls the flow of fluid through said nozzle block openings;

electrical control means for controlling the actuation of said valves; and wherein the dispensing openings at the outermost extents of said line in said nozzle block are located adjacent opposite edges of said exterior face, the distance from the center of each of said opposite outermost dispensing openings to the respective adjacent edge of said exterior face being one half the center to center distance of any two remaining dispensing openings in said line and wherein said nozzle block is carried in a removable front end mounted on said case to allow alternate nozzle blocks to be mounted on said case, said alternate nozzle blocks having different dispensing opening spacing.

2. The stackable fluid dispensing apparatus of claim 1, wherein said case has top and bottom surfaces and front and rear and side walls, said line of nozzles being located in a plane parallel to said front wall and perpendicular to the plane of said top and bottom surfaces.

3. The stackable fluid dispensing apparatus of claim 2, wherein the thickness of said case is less than the thickness of said nozzle block.

4. The stackable fluid dispensing apparatus of claim 2, wherein said nozzle block contains a plurality of transverse holes which communicate the front and rear walls thereof, each of said hole being adapted to receive a jeweled orifice adjacent the front wall thereof and a connecting tube within the rear wall thereof for communicating with said case fluid passage means.

5. The stackable fluid dispensing apparatus of claim 2, wherein said nozzle block contains a plurality of transverse holes which communicate the front and rear walls thereof, each of said holes being fitted with a connecting tube which, in turn, communicates with said case fluid passage means, each of said connecting tubes having a tube end adjacent said front wall which is adapted to receive a jeweled orifice for dispensing fluid communicated through said passage means.

6. The stackable fluid dispensing apparatus of claim 2, wherein said case contains a plurality of transverse openings which communicate with said fluid passage means and wherein said nozzle block contains a plurality of transverse holes, alignable with said case openings, and which communicate the front and rear walls of said nozzle block, each of said holes being adapted to receive a jeweled orifice adjacent the front wall thereof for dispensing fluid communicated through said fluid passage means.

7. The stackable fluid dispensing apparatus of claim 2, said nozzle block exterior face comprises a metal plate having a series of machined holes therein, said plate being received upon a portion of said nozzle block front wall which is provided with a plurality of transverse holes alignable with said plate holes, each of said nozzle block holes being fitted with a connecting tube for communicating with said fluid passage means.

8. A stackable print head for an ink jet printing device of the type having a case, a ink manifold located within the case and adapted to be connected to a source of pressurized ink, a plurality of valves located within the case, each of the valves being connected to the ink manifold by a fluid line, a plurality of ink nozzles, each of said nozzles being connected to a selected one of said valves by fluid passage means whereby actuation of said valves controls the flow of ink through said ink nozzles, and electrical control means for controlling the actuation of said valves, the improvement comprising:

a nozzle block carried in a removable front end mounted on said case, said nozzle block having an exterior face containing said plurality of ink nozzles positioned within said exterior face in at least one line, the nozzles at the outermost extents of said line being located adjacent opposite edges of said exterior face, the distance from the center of said opposite outermost nozzles to said respective adjacent edges of said exterior face being one half the center to center distance of any two remaining nozzles in said line.

9. A method of printing characters using an ink jet printing device of the type having a case, an ink manifold within the case which communicates with a source of pressurized ink, a plurality of valves within the case, each of said valves being connected to said ink manifold by a fluid line, a plurality of ink dispensing openings, each of said openings being connected to a selected one of said valves by a fluid passage means whereby actuation of said valves controls the flow of ink through said dispensing openings, and electrical control means for controlling the actuation of said valves, the method comprising the steps of:

providing said ink dispensing openings within a nozzle block carried in a removable front end which is mounted on said case, said ink dispensing openings being arranged in at least one line on an exterior face of said nozzle block, the dispensing openings at the outermost extents of said line being located adjacent opposite edges of said exterior face, the distance from the center of the opposite outermost of said openings to said opposite edge of said exterior face being one half the center to center distance of any two remaining dispensing openings in said line; and changing the character height of the characters printed with said device by substituting an alternate nozzle block for said removable nozzle block on said case, said alternate nozzle block having a different ink nozzle spacing.

10. A method of printing characters using an ink jet printing device of the type having a case, an ink manifold within the case which communicates with a source of pressurized ink, a plurality of valves within the case, each of said valves being connected to said ink manifold by a fluid line, a plurality of ink dispensing openings, each of said openings being connected to a selected one of said valves by a fluid passage means whereby actuation of said valves controls the flow of ink through said dispensing openings, and electrical control means for controlling the actuation of said valves, the method comprising the steps of:

providing said ink dispensing openings within a nozzle block carried in a removable front which is mounted on said case, said ink dispensing openings being arranged in at least one line on an exterior face of said nozzle block, the dispensing openings at the outermost extents of said line being located adjacent opposite edges of said exterior face, the distance from the center of the opposite outermost of said openings to said adjacent edges of said exterior face being one half the center to center distance of any two remaining dispensing openings in said line; and changing the character height of the characters printed with said device by stacking the nozzle blocks of two printing devices one upon the other with the dispensing openings of said blocks being aligned, the spacing of said dispensing openings being such that the distance between the center of the top outermost opening of said bottom device to the center of the bottom outermost opening of said top device is equal to the center to center distance of any two remaining openings in either of said nozzle blocks.

* * * * *